United States Patent [19]

Liao

[11] Patent Number: 6,098,486

[45] Date of Patent: Aug. 8, 2000

[54] BRAKE SYSTEM FOR A BICYCLE

[76] Inventor: Chi-Chao Liao, No. 5, Lane 2, Tungyang Rd., Fengyuan City, Taichung Hsien, Taiwan

[21] Appl. No.: 09/235,187

[22] Filed: Jan. 22, 1999

[30] Foreign Application Priority Data

Mar. 27, 1998 [TW] Taiwan ................................. 86106230

[51] Int. Cl.[7] ...................................................... B62L 1/06
[52] U.S. Cl. .................................... 74/500.5; 74/501.5 R; 188/24.11
[58] Field of Search ........................... 74/500.5, 501.5 R, 74/501.6, 502.2, 471 R, 480 R; 188/24.11, 24.22, 2 D, 24.16; 303/9.62, 9.64

[56] References Cited

U.S. PATENT DOCUMENTS

| 4,057,127 | 11/1977 | Woodring | 188/2 D |
|---|---|---|---|
| 4,480,720 | 11/1984 | Shimano | 188/2 D |
| 4,524,632 | 6/1985 | Ballard | 74/471 R |
| 4,526,057 | 7/1985 | Mochida et al. | 74/471 R |
| 4,773,509 | 9/1988 | Sato | 74/501.5 R |
| 4,920,819 | 5/1990 | Uchida et al. | 74/500.5 |
| 5,431,255 | 7/1995 | Tsuchie | 188/2 D |
| 5,660,081 | 8/1997 | Sato | 74/471 R |
| 5,732,601 | 3/1998 | Wu | 74/501.5 R |
| 5,829,314 | 11/1998 | Scura | 74/500.5 |
| 5,878,626 | 3/1999 | Gutierrez | 74/500.5 |
| 5,927,442 | 7/1999 | Liao | 74/500.5 |

Primary Examiner—David A. Bucci
Assistant Examiner—Chong H. Kim
Attorney, Agent, or Firm—Alan Kamrathk; Oppenheimer Wolff & Donnelly LLP

[57] ABSTRACT

A brake system for a bicycle includes a frame with two blocks received therein side by side, each of the two blocks having a protrusion extending from the rear end thereof so that a bridge member is mounted to the two protrusions. Two cables each have one end thereof connected to the respective block and the other end thereof extends through the top of the frame and is connected to the respective brake handle. A rear brake cable connected with the rear brake mechanism is connected to the bridge member and a front brake cable connected with the front brake mechanism movably extends between the two blocks. When either one of the first cable or the second cable is pulled, one of the blocks and the bridge member are moved so that the rear brake mechanism is first operated.

5 Claims, 5 Drawing Sheets

BRAKE SYSTEM FOR A BICYCLE

FIELD OF THE INVENTION

The present invention relates to a brake system for a bicycle, and more particularly, to a device for coordinating the brake actuating sequence of the front brake mechanism and the rear brake mechanism.

BACKGROUND OF THE INVENTION

The conventional brake system for a bicycle generally includes a front brake mechanism with a brake pad located on each side of the front wheel rim, and a rear brake mechanism with a brake pad located on each side of the rear wheel rim. Each mechanism has a brake cable connected to a brake handle attached to the handlebar of the bicycle so that when the rider squeezes the brake handle, the corresponding brake mechanism is operated to stop the front wheel or the rear wheel, respectively. Normally, the rider will operate the rear brake mechanism first and then actuate the front brake mechanism. It could be dangerous if the front brake mechanism is actuated prior to the rear brake mechanism, because the rear wheel could jump up and throw the rider over the handlebar. This will happen especially in panic situations.

The present invention intends to provide a brake system, which ensures the rear brake mechanism is actuated first no matter which brake handle is squeezed. With the brake system in accordance with the present invention, the rider will be protected during the dangerous situation mentioned above.

SUMMARY OF THE INVENTION

In accordance with one aspect of the present invention, there is provided a brake system comprising a frame having two top holes defined through the top thereof for the first cable and the second cable extending therethrough, and a first hole and a second hole respectively defined through the bottom of said frame for the front brake cable and the rear brake cable respectively extending therethrough.

A first block connected to the first cable has a first protrusion extending from the rear end thereof and a shoulder portion is defined in the top of the front end of said first block. A first groove is defined in the side of said first block and communicates with said shoulder portion of said first block. A second block connected to the second cable has a second protrusion extending from the rear end thereof and a shoulder portion is defined in the top of the front end of said second block. A second groove is defined in the side of said second block and communicates with said shoulder portion of said second block. The first block and said second block are movably located in said frame side by side with said first groove communicating with said second groove. The rear brake cable is fixedly connected to a bridge member which has two legs mounted to said first protrusion and said second protrusion. The front brake cable extends through the first groove and the second groove, and has an end piece with is engaged with the shoulder portions of the two blocks.

It is an object of the present invention to provide a brake system, which always brakes the rear wheel of the bicycle first.

Another object of the present invention is to provide a brake system wherein the tension of the first cable and the second cable is easily adjusted.

Further objects, advantages, and features of the present invention will become apparent from the following detailed description with appropriate reference to the accompanying drawings.

DETAILED DESCRIPTION OF THE PREFERRED EMBODIMENT

Figure 1:
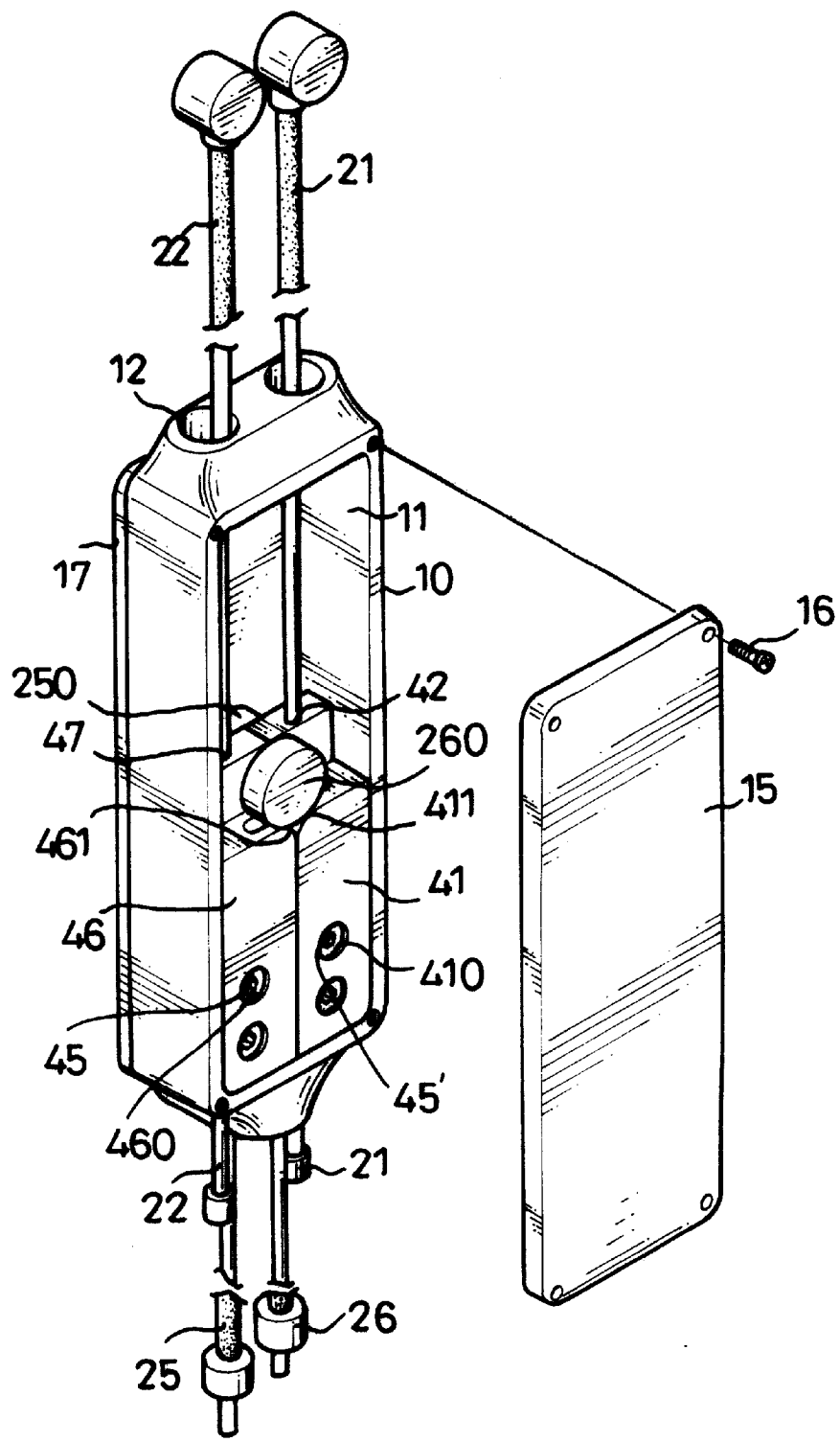
FIG. 1 is an exploded view of the brake system and a front cover in accordance with the present invention.
Figure 2:
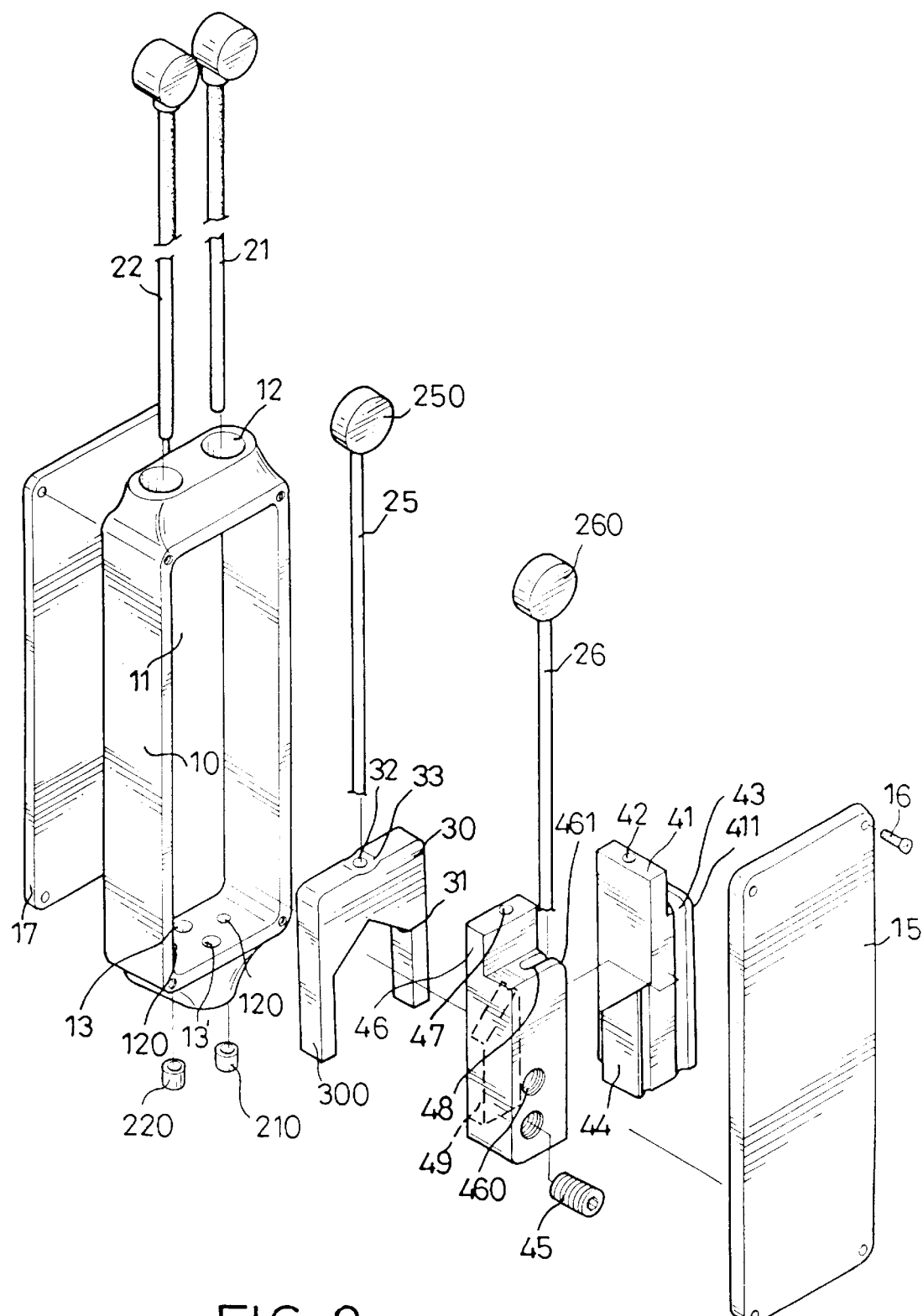
FIG. 2 is an exploded view of the brake system in accordance with the present invention.
Figure 3:
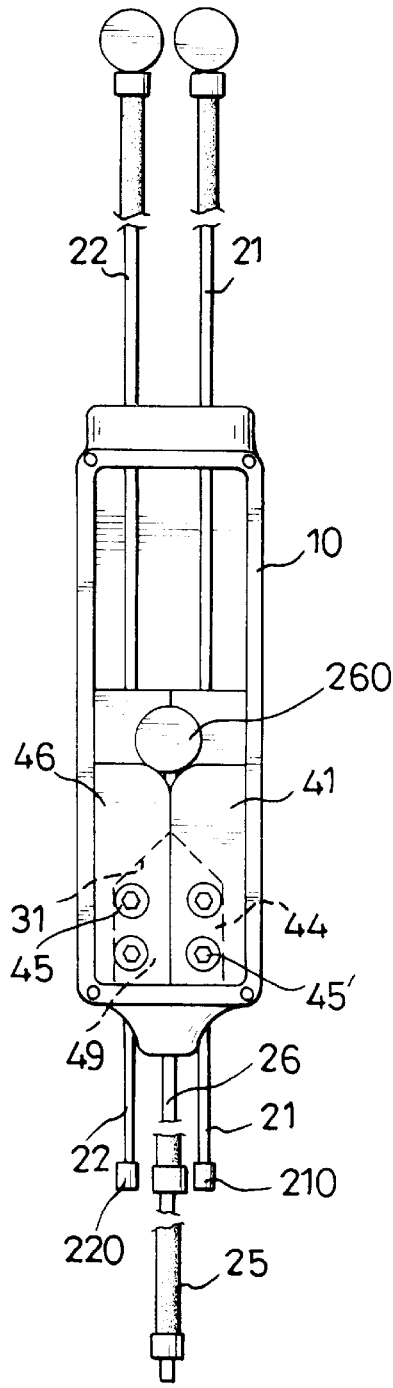
FIG. 3 is a front plan view of the brake system in accordance with the present invention when neither the first cable nor the second cable is pulled.

Referring to FIGS. 1 to 3, the brake system in accordance with the present invention comprises a frame (10) having two top holes (12) defined through the top thereof and a first hole (13) and a second hole (13') respectively defined through the bottom of said frame (10). A front cover (15) and a rear cover (17) are respectively connected to the frame (10) by bolts (16) so as to enclose the interior (11) of the frame (10). A first block (41) has a first protrusion (44) extending from the rear end thereof and a shoulder portion is defined in the top of the front end of said first block (41). A first groove (43) is defined in the side of said first block (41) and communicates with said shoulder portion of said first block (41). A first passage (42) is defined longitudinally through the first block (41) and two threaded holes (410) are defined from the front end of the first block (41), the two threaded holes (410) communicating with said first passage (42). A second block (46) has a second protrusion (49) extending from the rear end thereof and a shoulder portion is defined in the top of the front end of said second block (46). A second passage (47) is defined longitudinally through the second block (46). A second groove (48) is defined in the side of said second block (46) and communicates with said shoulder portion of said second block (46). Two threaded holes (460) are defined from the front end of the second block (46) and communicate with the second passage (47). The first block (41) and said second block (46) are movably located in said frame (10) side by side with said first groove (43) communicating with said second groove (48).

A bridge member (30) has two legs (300) mounted to said first protrusion (44) and said second protrusion (49), wherein an arrowhead-shaped recess (31) is defined in the bridge member (30) and located between the two legs (300) so as to engage with the two respective wedge-shaped tips of the first protrusion (44) and the second protrusion (49).

A first cable (21) and a second cable (22) respectively extend through said top holes (12) of the frame (10) and respectively extend through the first passage (42) of said first block (41) and the second passage (47) of said second block (46). The first cable (21) is fixedly connected to the first block (41) by engaging two bolts (45') into the two threaded holes (410) and contacting the first cable (21). The second cable (22) is fixedly connected to the second block (46) by engaging another two bolts (45) into the two threaded holes (460) and contacting the second cable (22). Two bottom holes (120) are defined through the bottom of said frame (10) so that said first cable (21) and said second cable (22) respectively extend through said two bottom holes (120). Each of the free ends of said first cable (21) and said second cable (22) extends beyond the bottom of said frame (10) has an end member (210/220) connected thereto.

A rear brake cable (25) has an end there extending through the hole (32) in said bridge member (30) and said first hole (13) of the frame (10) so as to be connected to the rear brake mechanism, and the other end of the rear brake cable (25) has an end piece (250) connected thereto which rests in a dent (33) defined in the top of the bridge member (30). A front brake cable (26) has an end thereof extending through said first groove (43), said second groove (48) and said second hole (13') so as to be connected with the front brake mechanism. An end piece (260) is connected to the other end of said front brake cable (26) and movably engaged with said two respective shoulder portions of said first block (41) and said second block (46). Each of the shoulder portions has a rounded corner (411/461) defined in the adjacent side thereof so that the end piece (260) can rest in a recess portion defined by the rounded corners (411, 461).

Figure 4:
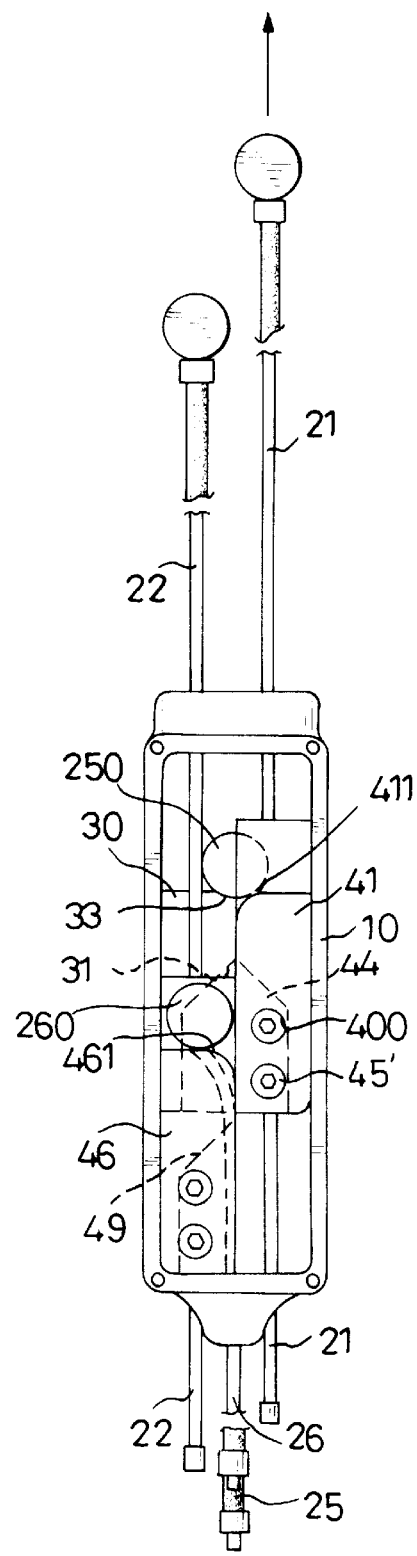
FIG. 4 is a front plan view of the brake system in accordance with the present invention when the first cable is pulled.
Figure 5:
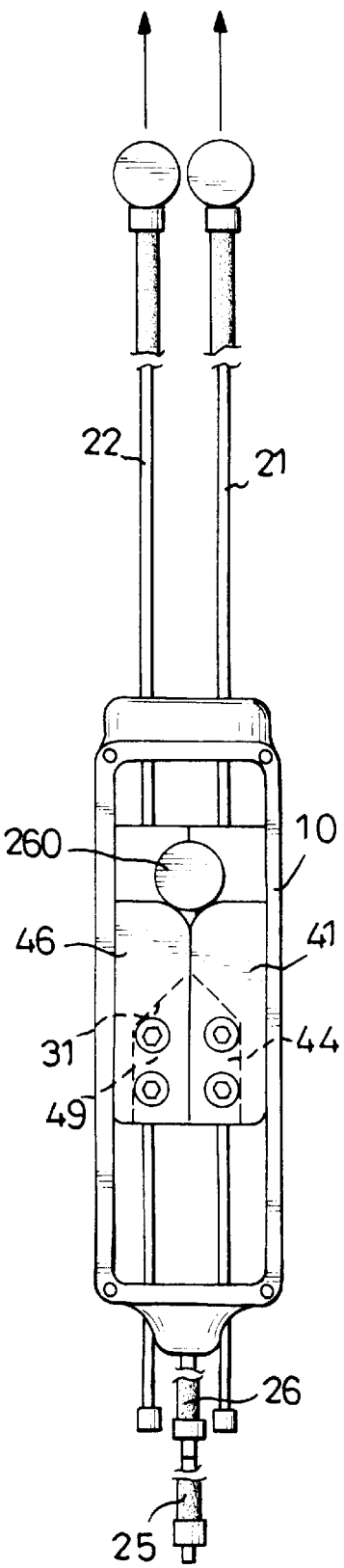
FIG. 5 is a front plan view of the brake system in accordance with the present invention when both of the first cable and the second cable are pulled.
Figure 6:
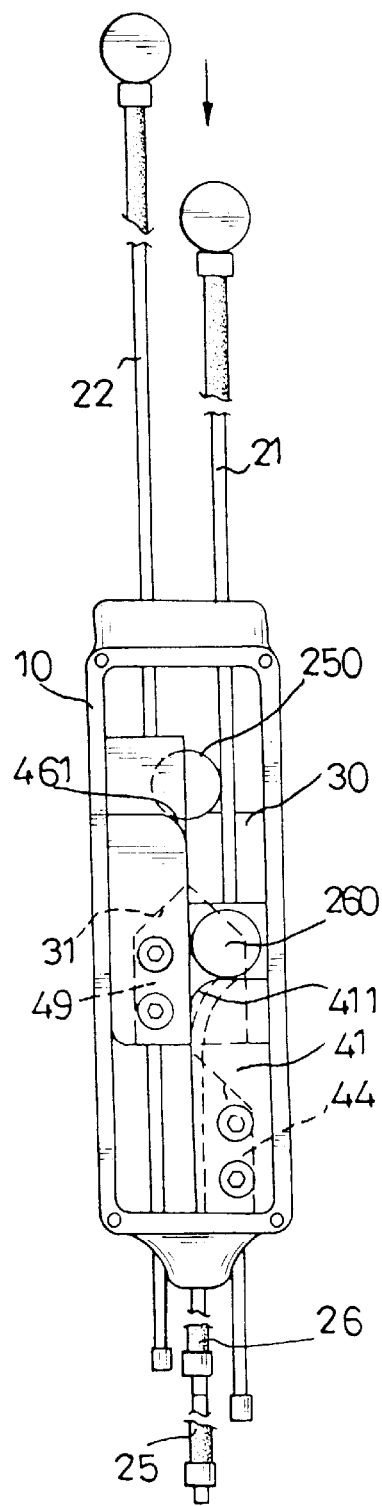
FIG. 6 is a front plan view of the brake system in accordance with the present invention when the first cable is released.
Figure 7:
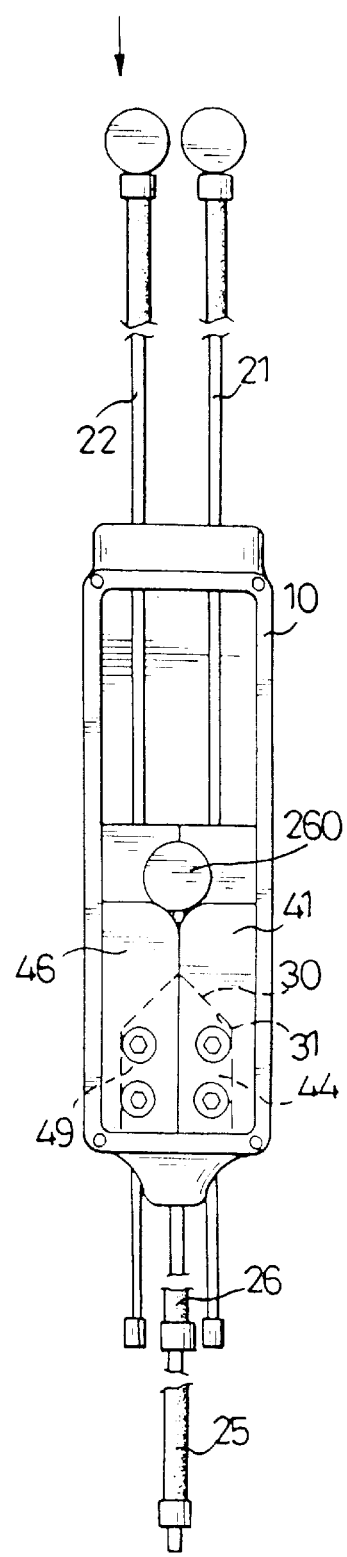
FIG. 7 is a front plan view of the brake system in accordance with the present invention when both the first cable and the second cable are released.

Referring to FIGS. 4 and 5, when either one of the brake handles is squeezed, the first cable (21) is pulled in this example, the bridge member (30) is moved with the first block (41) which is connected to the first cable (21) so that the rear brake cable (25) is pulled to actuate the rear brake mechanism. The end piece (260) is pushed by the rounded corner (411) and rests on the shoulder portion of the second block (46) when the first block (41) is moved upwardly so that the front brake cable (26) is not pulled until the second cable (22) is also pulled as shown in FIG. 5. FIG. 6 shows that when the first cable (21) is released, the first block (41) is lowered releasing the front brake cable (26) because the end piece (260) will be on the shoulder portion of the first block (41) due to the biased pull on the cable by the brake mechanism. The rear brake cable (25) is lowered to its original position together with the lowering of the bridge member (30) when the second cable (22) is released as shown in FIG. 7.

No matter which one of the handles is squeezed first, the brake system will actuate the rear brake mechanism first so that the bicycle can be properly stopped in any situation.

Although the invention has been explained in relation to its preferred embodiment, it is to be understood that many other possible modifications and variations can be made without departing from the spirit and scope of the invention as hereinafter claimed.

What is claimed is:

1. A brake system comprising:

a frame (10) having two top holes (12) defined through the top thereof and a first hole (13) and a second hole (13') respectively defined through the bottom of said frame (10);

a first block (41) having a first protrusion (44) extending from the rear end thereof, a shoulder portion defined in the top of the front end of said first block (41) and a first groove (43) defined in a side of said first block (41), said first groove (43) communicating with said shoulder portion of said first block (41);

a second block (46) having a second protrusion (49) extending from the rear end thereof, a shoulder portion defined in the top of the front end of said second block (46) and a second groove (48) defined in a side of said second block (41), said second groove (48) communicating with said shoulder portion of said second block (46), said first block (41) and said second block (46) movably located in said frame (10) side by side with said first groove (43) communicating with said second groove (48);

a bridge member (30) having two legs (300) mounted to said first protrusion (44) and said second protrusion (49);

a first cable (21) and a second cable (22) respectively extending through said top holes (12) and connected to said first block (41) and said second block (46), and a rear brake cable (25) connected to said bridge member (30) and extending through said first hole (13) so as to be adapted to connect with the rear brake mechanism, a front brake cable (26) extending through said first groove (43) and said second groove (48), and extending through said second hole (13') so as to be adapted to connect with the front brake mechanism, an end piece (260) connected to the free end of said rear brake cable (26) and movably engaged with said two respective shoulder portions of said first block (41) and said second block (46).

2. The brake system as claimed in claim 1, wherein said first block (41) has a first passage (42) defined longitudinally therethrough for said first cable (21) extending therethrough and said second block (46) has a second passage (47) defined longitudinally therethrough for said second cable (22) extending therethrough, each of said first block (46) and said second block (41) having a threaded hole (410/460) which communicates with said first passage (42) and said second passage (47) so that said first cable (21) and said second cable (22) are respectively and fixedly connected to said first block (41) and said second block (46) by extending two bolts (45) through said two respective threaded holes (410/460) and contacting said first cable (21) and said second cable (22).

3. The brake system as claimed in claim 2 further comprising two bottom holes (120) defined through the bottom of said frame (10) so that said first cable (21) and said second cable (22) respectively extend through said two bottom holes (120).

4. The brake system as claimed in claim 2, wherein each of the free ends of said first cable (21) and said second cable (22) extending beyond the bottom of said frame (10) has an end member (210/220) connected thereto.

5. The brake system as claimed in claim 1 further comprising an arrowhead-shaped recess (31) defined in said bridge member (30) and located between the two legs (300), said first protrusion (44) and said second protrusion (49) each having a wedge-shaped tip so as to respectively engage with said arrowhead-shaped recess (31).

* * * * *